June 5, 1928.
A. LENNING
REFRIGERATION
Filed Jan. 22, 1927
1,672,265
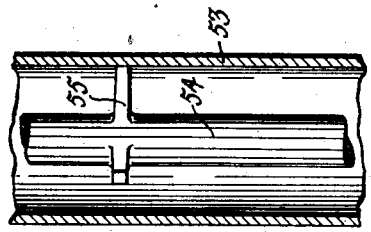
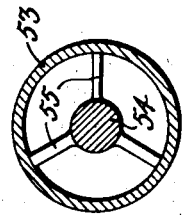
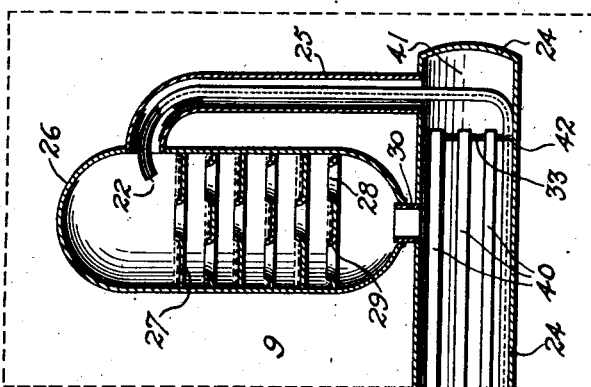

Patented June 5, 1928.

1,672,265

UNITED STATES PATENT OFFICE.

ALVAR LENNING, OF BROOKLYN, NEW YORK, ASSIGNOR TO ELECTROLUX SERVEL CORPORATION, OF NEW YORK, N. Y., A CORPORATION OF DELAWARE.

REFRIGERATION.

Application filed January 22, 1927, Serial No. 162,921, and in Germany July 31, 1926.

My invention relates to the art of refrigeration through the agency of absorption, heating and cooling. I contemplate various improvements upon existing devices which operate to give higher efficiency and simplified construction.

I have found that there is some difficulty in starting a unit of the constant pressure absorption type or one in which no appreciable pressure differences are available and wherein the refrigerant, pure or dilute, passes through small conduits or pipes. This is particularly true of the refrigerant conduit connecting the condenser with the evaporator of a constant pressure system where this conduit passes from the condenser downwardly and through a heat exchanger and then upwardly to the evaporator. I have found that increase of diameter of pipes to facilitate starting is not generally desirable. I have found that the difficulty of starting in such an instance, which is due to capillary resistance, can be overcome by using a wick, preferably consisting of a metal wire or a series of metal wires running all the way through the liquid conduit. It is accordingly one object of the present invention to provide a system wherein starting is made easy and quick and wherein the capillary resistance to starting is overcome by means of the provision of a wick which serves to induce flow of liquid through the conduit.

I have further found that an improved apparatus is obtained by using a continuous conduit as a cooling element for such parts as the absorber. By using a pipe of relatively small diameter, the velocity of water or other cooling liquid is made much higher than in an ordinary cooling jacket, thus producing improved heat transfer. Such a coil is preferably made of copper or other non-corroding metal which eliminates the rusting which is liable to occur in the jacket ordinarily used in connection with an iron or steel vessel. I further improve such apparatus by thermally connecting the coil with the absorber by soldering or dipping in tin or by means of an aluminum casting surrounding the convolutions of the coil. Such a coil arrangement may be used with advantage where indirect cooling of the absorber and the condenser is employed, utilizing a closed system containing a boiling liquid.

In another phase of my invention, I propose to improve heat transfer and evaporation in systems utilizing a pressure equalizing gas. To this effect, the refrigerant carrying conduit connecting the condenser with the evaporator is so arranged in a vessel situated below the evaporator that unevaporated refrigerant flowing from the evaporator into this lower vessel evaporates around the refrigerant conduit, whereby all refrigerant is utilized and the precooling of the refrigerant before entering the evaporator is intensified.

It is my object, further, to simplify the construction of apparatus arranged to precool absorption liquid before entering the absorber. In order to obtain high efficiency of absorption liquid precooling with simplified construction, I use the above mentioned coil surrounding the absorber and contact the absorption liquid conduit leading to the absorber with a plurality of points on different convolutions of the coil. The contact points are soldered or otherwise fusibly connected in order to obtain good heat transfer.

I propose further to enhance the rate of heat transfer between cooling water and weak absorption liquid and to this end I insert in the absorption liquid line a core which increases the velocity of liquid.

In order to secure good heat transfer in gas heated absorption refrigerators, I utilize a generator with a central flue and place an extended core within the flue which forms a narrow annular passageway for combustion gases in contact with the metal of the generator. This reduces the thickness of the gas layer through which the heat has to pass.

With the above and other objects in view, I have hereinafter described preferred means for carrying out the objects, in the form of description of apparatus illustrated on the accompanying drawing of which:

Fig. 1 is a more or less diagrammatic drawing, in sectional-elevation views, of an apparatus embodying my invention but amply clear to enable one skilled in the art to which the invention relates to make, construct and use the same;

Fig. 2 is a cross section of a conduit shown in Fig. 1; and

Fig. 3 is an end view of the conduit shown in Fig. 2.

Referring more particularly to Fig. 1, reference character 10 designates a generator which is divided into two chambers 11 and 12 by partition 13. The structure making up chamber 11 may be considered the main generator and the structure making up chamber 12 may be considered an auxiliary generator. Chamber 12 communicates with chamber 11 through a conduit 14 which is made and arranged so as to form the upwardly extending vapor and liquid pipe of a thermo-siphon. A flue 15 passes centrally through generator 10. A suitable source of heat, as for instance, the gas burner 16, is placed in the bottom of flue 15 and an extended, generally cylindrical baffle 17 within flue 15 serves to decrease the thickness of the hot gas layer therein while at the same time increasing the velocity of the hot gases therethrough which increases the rate of heat transfer from the hot gases to the generator.

A conduit 18 connects the top of chamber 11 with the inner space of rectifier-condenser 19 and serves to convey vapor from the generator to the rectifier-condenser. Member 19 constitutes both a rectifier and a condenser. Rectifier-condenser 19 is cylindrical and is tilted from the horizontal as shown and conduit 18 runs upwardly along the bottom thereof. Rectifier-condenser 19 is partially surrounded by cooling water jacket 20. From the lowest point in rectifier-condenser 19, which is within a well 8, a conduit 21 passes downwardly through conduit 23, horizontally through heat exchanger 24 and upwardly through conduit 25 to the upper part of evaporator 26 which is situated within the space 9 to be cooled. A fine wire constituting a wick 22 is placed within conduit 21 throughout its entire length. Within evaporator 26 is a series of disks 27. Disks 27 are formed with holes surrounded by raised rims 29. Holes in adjacent disks are preferably staggered relative to each other. A conduit 30 connects the bottom of evaporator 26 with space 31 formed between tube heads 32 and 33 and around tubes 40 within heat exchanger 24. A conduit 35 connects space 31 with the lower part of absorber 36. Absorber 36 is supplied with disks 37 which may be similar in form to disks 27 within evaporator 26. A conduit 23 connects the top of absorber 36 with space or end chamber 39 formed between tube head 32 and the adjacent end of heat exchanger 24. Tubes 40 connect space 39 with space 41 which latter space is formed between tube head 33 and the adjacent end of heat exchanger 24. The tubes are fastened into the tube heads in any preferred manner. Conduit 25 connects space or end chamber 41 with the upper part of evaporator 26. Small capillary holes 42 are provided in tube heads 32 and 33 adjacent to where conduit 21 passes through the tube heads. A small projection 43 is provided on the under side of conduit 21 where it passes above the upper end of conduit 35.

A cooling coil 44 passes around and is welded or soldered or connected by means of any other fused metal connection to the outside of absorber 36. Cooling water is introduced through conduit 45 into coil 44 and is discharged through conduit 46 to water jacket 20 and is finally discharged through conduit 47.

A conduit 48 leads from the bottom of absorber 36 to a filling plug 49. A conduit 50 leads from conduit 48 to heat exchanger 51. A conduit 52 leads from heat exchanger 51 to the upper part of chamber 12 in generator 10. A conduit 53 leads from the lower part of chamber 11, through heat exchanger 51 and to the upper part of absorber 53. The conduit conducting the hotter liquid from the generator to the absorber passes within the conduit conducting the colder liquid from the absorber to the generator in order to reduce radiation losses. A portion of conduit 53 is welded to cooling coil 44 so as to be in heat exchange relation therewith. Within this portion of conduit 53 which is in heat exchange relation with coil 44 a liquid displacing member such as a rod 54 (Figs. 2 and 3) is placed and supported by a number of arms 55. The purpose of rod 54 is to increase the velocity of the liquid within that portion of conduit 53 and thereby increase the rate of heat transfer between this liquid and the cooling water in coil 44.

A gas ventilation conduit 56 connects condenser 19 with space 31 within heat exchanger 24.

The operation of the apparatus is as follows:

Chamber 11 of generator 10 contains a solution which consists of a refrigerant, for instance ammonia, dissolved in an absorbing medium, for instance water. Application of heat from gas burner 16 drives the ammonia out of solution and it passes in vaporous form upwardly through conduit 18. Any water vapor that may be entrained with the ammonia vapor is condensed in that portion of conduit 18 which lies within rectifier-condenser 19 and runs back to chamber 11. The dry gaseous ammonia passes out of conduit 18 in rectifier-condenser 19 and is here condensed to a liquid by the cooling action of the water jacket 20. The condensed ammonia being cooler than the superheated ammonia vapor with water entrained in conduit 18, serves to cool the vapor within conduit 18. The boiling point of water, the absorption liquid, being higher than the boiling point of ammonia, the water vapor in conduit 18 is condensed by liquid ammonia in the rectifier-condenser surrounding conduit 18 while it is impossible with this arrangement to have condensation of ammonia in conduit 18 since the heat transfer from the vapor in conduit 18 to the liquid ammonia surrounding conduit 18 cannot continue to such degree of equalization that equal temperatures are obtained. A small quantity of hydrogen may pass from absorber 36 through generator 10 to rectifier-condenser 19 where it would tend to collect as it is non-condensable at temperatures which prevail in the rectifier-condenser. To prevent the possibility of the formation of a gas pocket in rectifier-condenser 19, conduit 56 is provided which allows the passage of gas from rectifier-condenser 19 to space 31 in heat exchanger 24. The liquid ammonia passes from rectifier-condenser 19 through conduit 21 in which is located the wick consisting of a metal wire 22. The purpose of wick 22 is to reduce the capillary resistance to flow in conduit 21, especially when the apparatus is first started after an idle period. Wick 22 operates to quickly carry liquid ammonia from the rectifier-condenser to the evaporator. The liquid ammonia passes from conduit 22 into the upper part of evaporator 26. Rectifier-condenser 19 is situated at such a distance above the evaporator that the liquid ammonia flows into the evaporator by gravity. A gas inert with respect to ammonia, for instance hydrogen, is introduced into the top of evaporator 26 through conduit 25. Refrigeration in evaporator 26 is produced as a result of the diffusion of the ammonia into the hydrogen. This diffusion is aided by disks 27 which are so constructed as to retain liquid ammonia in shallow pools thereon until it diffuses. As ammonia has a greater specific weight than hydrogen, a mixture of ammonia and hydrogen has a greater specific weight than pure hydrogen. For this reason, and due to the arrangement of apparatus, the gaseous ammonia-hydrogen mixture formed in the evaporator will pass downwardly through the holes 28 in disks 27 within evaporator 26 and out through conduit 30 to space 31 in heat exchanger 24. Here it is in heat exchange relation with liquid ammonia in conduit 21 and with hydrogen in conduits 40 and absorbs heat from both of these substances. The mixture of ammonia and hydrogen passes out of space 31 through conduit 35 to the lower part of absorber 36. Within absorber 36 the mixture comes in contact with water which passes downwardly over disks 37. The water absorbs the ammonia gas and heat is generated. This heat is absorbed by the cooling water in coil 44. The hydrogen is not absorbed and as it is lighter than the ammonia-hydrogen mixture it passes upwardly through absorber 36 and through conduit 23 to space 39 in heat exchanger 24. Any liquid that is carried into space 39 will collect in the bottom thereof and pass through capillary hole 42 in head 32. Projection 43 on conduit 21 above the opening of conduit 35 serves to prevent any liquid following along the outside of conduit 21 beyond this point. Any liquid which reaches projection 43 will drop therefrom into conduit 35 and run back into the absorber. As hole 42 is very small it is usually closed with a capillary film of liquid and hence allows no gas to pass therethrough. The hydrogen gas passes from space 39 through tubes 40 to space 41 and thence upwardly through conduit 25 to the upper part of evaporator 26 where it again mixes with the ammonia. Conduit 21 passes in close contact with the inside of the shell of heat exchanger 24 at the lowest part thereof so that liquid refrigerant flowing out of the bottom of the evaporator settles around conduit 21 and evaporates in contact therewith whereby the ammonia entering the evaporator is cooled to a great degree.

The water in the lower part of the absorber, known as strong solution, which contains a relatively large percentage of ammonia in solution, passes out of absorber 36 through conduits 48 and 50 to heat exchanger 51. Here it absorbs heat from the water which passes through conduit 53. Heat exchanger 51 may be of such length or size or of such construction as to give the desired amount of heat transfer. The strong solution passes from heat exchanger 51 through conduit 52 to chamber 12 of generator 10. From chamber 12 the strong solution is elevated through thermo-siphon tube 14 due to heat applied by the gas burner 16 and the arrangement of parts, to the upper part of chamber 11. To effect the thermo-siphon action, the level of liquid in the absorber is higher than in chamber 12. In chamber 11 the ammonia is driven out of solution by the application of heat as previously described. The water which contains but a relatively small percentage of ammonia in solution, known as the weak solution, passes downwardly through chamber 11 and through conduit 53 to the top of absorber 36. The weak solution gives up some of its heat to the strong solution in heat exchanger 51 and is further cooled by the cooling water in coil 44. I provide a coil as the absorber cooling element in preference to a jacket since the cooling fluid in the coil is at relatively high velocity due to the smaller cross-sectional area of a pipe formed as a coil.

Though I prefer a coil, any form of continuous tubing or the like may be used. If desired, the tubing may be fixed in heat transfer relation to the absorber by casting an aluminum block around the same. The tubing forming the coil or other continuous conduit is preferably made of copper so that there is little or no chance of corrosion. By welding, soldering, or otherwise fusibly connecting the straight vertical portion of conduit 53 extending upwardly alongside the absorber to the copper coil 44 a simple construction is obtained for precooling the weak absorption liquid passing into the absorber. Conduit 53 is attached to the copper coil at each point of contact 58 by soldering or the like. A rod 54 is inserted in that portion of conduit 53 which is in heat exchange relation with coil 44. Rod 54 reduces the area of the passageway through conduit 53 and therefore increases the velocity of the weak solution which passes therethrough which results in a better heat transfer from the weak solution to the cooling water.

While I have described the preferred apparatus for carrying out the various phases of my invention, I wish it understood that I do not limit myself to the arrangement of apparatus shown and have merely disclosed one form of apparatus as sufficient under the requirements of the patent statutes.

Having thus described my invention, what I claim is:

1. In a refrigerating apparatus, the combination with a device for liquefying a refrigerant, an evaporator and a conduit for conducting the liquefied refrigerant from said device to said evaporator of a wick within said conduit.

2. In a refrigerating apparatus, the combination with a device for liquefying a refrigerant, an evaporator, an extended open conduit connecting said device with said evaporator for conducting liquid by gravity from said device to said evaporator, of a metal wick extending within and throughout said conduit.

3. In an absorption refrigerating apparatus, in combination, an absorber, an evaporator, a heat exchanger, a condenser situated at a higher level than said evaporator and said heat exchanger, conduits connecting said absorber with said heat exchanger and said evaporator with said heat exchanger for circulating a gas through said absorber and evaporator and in heat exchange relation with itself in said heat exchanger, a conduit connecting said condenser with said evaporator and arranged to pass in heat exchange relation with gas in said heat exchanger and a metal wick extending throughout the length of the last mentioned conduit.

4. In an absorption refrigerating apparatus, in combination, a generator, an absorber, an evaporator, a heat exchanger situated at a lower level than said evaporator, a condenser situated at a higher level than said generator, absorber, evaporator and heat exchanger, means for circulating absorption liquid between the generator and absorber, conduits connecting said absorber with said heat exchanger and said evaporator with said heat exchanger for circulating a gas through said absorber and evaporator, a conduit connecting said generator with said condenser, a conduit connecting said condenser with the upper part of said evaporator and extending through said heat exchanger and a metal wick extending throughout the length of the last mentioned conduit.

5. In an absorption refrigerating apparatus, in combination, a generator, an absorber, a heat exchanger, means to circulate a gas through said absorber, conduits connecting different spaces of said heat exchanger with said generator, a coil wound around said absorber for circulation of cooling liquid, a conduit connecting the bottom of the absorber with one space of said heat exchanger and a conduit connecting the other space of said heat exchanger with the top of said absorber, the last mentioned conduit extending vertically and contacting with a plurality of convolutions of said coil and a fused metal connection between the upwardly extending conduit and said convolutions.

6. In an absorption refrigerating system, a condenser, an evaporator, an absorber, a vessel situated below said evaporator, means for circulating a gas through said evaporator, vessel and absorber and a conduit connecting said condenser with said evaporator, said conduit being arranged to pass through the lowermost portion of said vessel, the arrangement being such that liquid refrigerant passing from said evaporator to said vessel evaporates adjacent said conduit.

7. In an absorption refrigeration system, in combination, an absorber, an evaporator, a heat exchanger situated below said evaporator and having a space connected with the lower part of said evaporator adapted to receive liquid refrigerant therefrom, conduits for circulating a gas through said absorber, through said heat exchanger, and through said evaporator, a condenser, and a conduit connecting said condenser with said evaporator passing through said space at the bottom thereof and in contact with the wall thereof.

8. Absorption refrigerating apparatus comprising a generator, a condenser, an evaporator, and an absorber, the aforementioned parts being interconnected to form a system wherein a plurality of fluids circulate, said system including a horizontal heat exchanger connected between the absorber and evaporator and comprising a shell, tube heads within said shell forming end chambers and a central space, tubes fastened into said tube heads and forming passages connecting said end chambers, an opening at the bottom of one of said tube heads, a conduit passing through said opening and along the bottom of said shell, an opening in the bottom of said shell over which said conduit passes and a projection on said conduit within said opening for preventing passage of liquid along said conduit over said opening.

9. Absorption refrigerating apparatus comprising, in combination, a generator, a condenser, an evaporator, an absorber, means to conduct vapor from said generator to said condenser, means to conduct liquid from said condenser to said evaporator, means to conduct gaseous fluid from the evaporator to the absorber, a plurality of members within the absorber for distributing liquid, a continuous conduit on the outside of said absorber, fused metal connection between said continuous conduit and said absorber, said continuous conduit being adapted for the circulation of a cooling medium therethrough and means for circulating absorption liquid between the generator and absorber, the last-mentioned means including a conduit in heat exchange relation with said continuous conduit by fused metal connection.

10. Absorption refrigerating apparatus comprising, in combination, a generator, a condenser, an evaporator, an absorber, means to conduct vapor from said generator to said condenser, means to conduct liquid from said condenser to said evaporator, means to conduct gaseous fluid from the evaporator to the absorber, a plurality of members within the absorber for distributing liquid, a continuous conduit on the outside of said absorber, fused metal connection between said continuous conduit and said absorber, said continuous conduit being adapted for the circulation of a cooling medium therethrough, means for circulating absorption liquid between the generator and absorber, the last-mentioned means including a conduit in heat exchange relation with said continuous conduit by fused metal connection, and a liquid displacing member extending within the last-mentioned conduit opposite the fused metal connection for increasing the rate of flow of absorption liquid where the heat transmission to the continuous coil takes place.

11. Absorption refrigerating apparatus comprising, in combination, a generator containing a refrigerant in solution, a condenser connected to the generator for liquefying the refrigerant, an evaporator connected to receive liquid refrigerant from the condenser, an absorber, means to circulate an auxiliary gas through the evaporator and absorber in the presence of which the refrigerant evaporates, a cooling member for the condenser, a continuous conduit on the outside of said absorber, fused metal connection between said conduit and said absorber, said conduit being adapted for the circulation of a cooling medium therethrough, and means to connect said conduit with the cooling member for the condenser.

12. Absorption refrigerating apparatus comprising, in combination, a generator, a condenser, an evaporator, an absorber, said absorber comprising a cylindrical shell, means to conduct vapor from said generator to said condenser, means to conduct liquid from said condenser to said evaporator, means to conduct gaseous fluid from the evaporator to the absorber, a plurality of circular disks within the absorber for distributing liquid, a continuous coil conduit wound around the outside of the absorber shell, fused metal connection between said conduit and said absorber shell, said conduit being adapted for the circulation of a cooling medium therethrough, and means for circulating absorption liquid between the generator and absorber, the last-mentioned means including a vertically extending conduit arranged in heat exchange relation with said continuous coil at a plurality of places by fused metal connection and a liquid displacing member extending within the last-mentioned vertically extending conduit opposite the places of fused metal connection for increasing the rate of flow of absorption liquid at the places of heat transmission between the vertically extending conduit and the coil.

13. Absorption refrigerating apparatus comprising, in combination, a generator containing a refrigerant in solution, a condenser connected to the generator for liquefying the refrigerant, an evaporator connected to receive liquid refrigerant from the condenser, an absorber, said absorber comprising a cylindrical shell, means to circulate an auxiliary gas through the evaporator and absorber in the presence of which the refrigerant evaporates, a series of circular disks in said absorber, a continuous copper coil wound around the outside of said absorber adapted for conduction of a cooling fluid therethrough, fused metal connection between said coil and said absorber and means to circulate absorption liquid between the generator and absorber.

14. Absorption refrigerating apparatus comprising, in combination, a generator containing a refrigerant in solution, a condenser connected to the generator for liquefying the refrigerant, an evaporator connected to receive liquid refrigerant from the condenser, an absorber, said absorber comprising a cylindrical shell, means to circulate an auxiliary gas through the evaporator and absorber in the presence of which the refrigerant evaporates, a series of circular disks in said absorber, a continuous copper coil wound around the outside of said absorber adapted for conduction of a cooling fluid therethrough, fused metal connection between said coil and said absorber and means to circulate absorption liquid between the generator and absorber, the last-mentioned means including a conduit arranged in direct heat transmitting relation with said coil by fused metal connection at a plurality of points with said coil.

15. Absorption refrigerating apparatus comprising a generator comprising a cylindrical shell, a condenser connected to the generator for receiving vapor of refrigerant therefrom and liquefying the refrigerant, an evaporator connected to receive liquid refrigerant from the condenser, an absorber, means to circulate an auxiliary gas through the evaporator and absorber in the presence of which the refrigerant evaporates, a flue extending through said generator shell, a partition within said shell forming a main generator and an auxiliary generator, a thermo-siphon tube connecting said auxiliary generator with said main generator, said auxiliary generator being arranged below said main generator, a conduit connecting the lower part of the absorber with the auxiliary generator, a baffle in the generator flue and means for cooling the absorber and the condenser including a continuous conduit extending around the absorber.

In testimony whereof I hereunto affix my signature.

ALVAR LENNING.